United States Patent
Chang et al.

(10) Patent No.: US 9,572,221 B2
(45) Date of Patent: Feb. 14, 2017

(54) AUTO-SENSING DIMMING LAMP

(71) Applicant: UNITY OPTO TECHNOLOGY CO., LTD., New Taipei (TW)

(72) Inventors: Wei Chang, New Taipei (TW); Kai-Cheng Chuang, New Taipei (TW); Yi-Shu Chen, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 14/821,954

(22) Filed: Aug. 10, 2015

(65) Prior Publication Data

US 2016/0381757 A1    Dec. 29, 2016

(30) Foreign Application Priority Data

Jun. 23, 2015  (TW) .............................. 104210025 U

(51) Int. Cl.
| | | |
|---|---|---|
| H05B 33/08 | (2006.01) | |
| H05B 37/02 | (2006.01) | |
| F21S 8/02 | (2006.01) | |
| F21V 8/00 | (2006.01) | |

(52) U.S. Cl.
CPC ........... *H05B 33/0854* (2013.01); *F21S 8/026* (2013.01); *G02B 6/0096* (2013.01); *H05B 37/0218* (2013.01)

(58) Field of Classification Search
None
See application file for complete search history.

(56) References Cited

U.S. PATENT DOCUMENTS

| | | | | |
|---|---|---|---|---|
| 2014/0354150 A1* | 12/2014 | Joseph | ............... | H05B 33/0872 315/51 |
| 2015/0373808 A1* | 12/2015 | Kuo | ................... | H05B 37/0218 315/158 |

\* cited by examiner

*Primary Examiner* — Dedei K Hammond
(74) *Attorney, Agent, or Firm* — Rosenberg, Klein & Lee

(57) ABSTRACT

An auto-sensing dimming lamp guides ambient light to a sensor installed in a lamp cover and at a base through a light pipe. The auto-sensing dimming lamp automatically adjusts a light emission status of LED light sources according to the ambient light by a processor installed at the base. The processor includes a pass filter unit and a modulation unit, and the pass filter unit receives a detected signal waveform of the sensor and a driving voltage waveform of the LED light sources.

11 Claims, 6 Drawing Sheets

AUTO-SENSING DIMMING LAMP

CROSS-REFERENCE TO RELATED APPLICATIONS

This non-provisional application claims priority under 35 U.S.C. §119(a) on Patent Application No(s). 104210025 filed in Taiwan, R.O.C. on Jun. 23, 2015, the entire contents of which are hereby incorporated by reference.

TECHNICAL FIELD

The technical field relates to lamps, and more particularly to an auto-sensing dimming lamp capable of automatically adjusting the lighting status according to external light conditions and eliminating obtrusive light to enhance the sensing accuracy.

BACKGROUND

Lamp is one of the necessary electronic appliances of our life. As technology advances, environmental awareness arises, and lighting requirements change, the type of lamps has evolved from incandescent lamps of the early stage to the lamps that use light emitting diode (LED) as a light source.

In addition to the foregoing evolution and requirement of the lamps, energy saving is also one of the important factors that needs to be taken into consideration for the design of the lamps. Although LED lamps have a better energy saving effect than the traditional incandescent lamps, the LED lamps also consume a relatively large quantity of energy during a long time of use, particularly in an environment with strong sunlight or sufficient light, because the brightness of the LED lamps is generally slightly higher than the brightness of sunlight or sometimes even lower than the brightness of sunlight. Therefore, it consumes more energy for the application of the LED lamps in the aforementioned situations. To meet requirements, related manufacturers further developed a dimming LED lamp, so that users may adjust the brightness of the LED lamp at a predetermined time automatically. For example, the LED lamp may be set to turn off or dim its light at noon when sunlight is relatively strong, or in the afternoon while receiving the sunlight, so as to achieve the energy saving effect.

However, the intensity of sunlight is not just limited to the factor of time, but weather may also affect the brightness of sunlight received in an area where the LED lamp is installed. Although the way of just using the factor of time as the condition to set and enable the dimming function can achieve the energy saving effect, the light received by the users may be too bright or too dark due to the non-uniform intensity of the sunlight, and the users may feel uncomfortable to the LED lamp. If the lamp is adjusted according to the current condition of the ambient light, the users have to manually adjust the brightness of the lamp from time to time. Regardless of the distance from the lamp, it is inconvenient for the users to adjust the brightness of the lamp all the time.

In order to adjust the brightness of the LED lamp according to the ambient light automatically and provide a convenient and comfortable lighting effect to users, a sensor is installed in the LED lamp for detecting external light and adjusting the brightness of lighting according to the detected result. The installation of the sensor provides a convenient way of controlling the brightness of the lamp without requiring the users to manually adjust and control the brightness of the lamp, so as to improve the convenience of use. However, when the sensor detects the external ambient light, the detection may be affected by the light generated during the operation of the LED, so that the actual intensity of the ambient light cannot be detected accurately or the brightness of the LED lamp cannot be adjusted according to the accurate detected result. Obviously, the aforementioned design with the sensor fails to provide the best lighting effect to users.

In view of the aforementioned problem, the inventor of this disclosure discloses an auto-sensing dimming lamp that uses the sensor to detect the ambient light automatically while filtering the obtrusive light, so that the lamp can modulate the brightness of the lamp to the best lighting status according to the brightness of the external light.

SUMMARY

In view of the problems of the prior art, it is a primary objective of this disclosure to provide an auto-sensing dimming lamp capable of adjusting the brightness of the lamp according to the external ambient light, so as to provide appropriate light to users and achieve the energy-saving effect.

Another objective of this disclosure is to provide an auto-sensing dimming lamp capable of eliminating any obtrusive light other than the actual ambient light effectively to enhance the accuracy of sensing and the dimming precision of a light emission status.

To achieve the aforementioned and other objectives, this disclosure provides an auto-sensing dimming lamp comprising a base, a plurality of LED light sources, a sensor and a lamp cover. The LED light sources and the sensor are installed at the base, and the lamp cover is covered onto the base and coupled to an edge of the base for sealing the LED light sources and the sensor. The auto-sensing dimming lamp further comprises: a light pipe installed at the lamp cover and extended from the lamp cover towards the base, and an end of the light pipe abutting against the sensor to guide an external ambient light to enter into the lamp cover and to be detected by the sensor; and a processor installed at the base and comprising: a pass filter unit electrically coupled to the sensor and the LED light sources for receiving a detected signal detected by the sensor and a driving voltage waveform of the LED light sources, wherein if a section of the level of the driving voltage waveform equals to zero, a detected signal waveform of the section has a residual light level and an ambient light level, and the residual light level is higher than the ambient light level, and the pass filter unit just captures the ambient light level and eliminates the residual light level; and a modulation unit electrically coupled to the pass filter unit for automatically adjusting a light emission status and driving the LED light sources according to the information of the ambient light level.

Wherein, the processor has a switching frequency set for the LED light sources, and the switching frequency falls within a range of 1K-4 KHz. In the range of such switching frequency, the auto-sensing dimming lamp minimizes the residual light effect to prevent flickers.

In addition, the light emission status of the LED light sources is automatically adjusted and driven according to the information of the ambient light level, and a sensing light is outputted with multistage different brightness by adjusting the duty ratio of the driving voltage waveform. Therefore, the auto-sensing dimming lamp provides a diversified lighting status.

In addition, the light pipe has a light incident surface and a light exit surface, and the light incident surface is disposed on an outer plane of the lamp cover, and the light exit surface is abutted and contacted with the sensor. Preferably, the light incident surface has an area greater than the area of the light exit surface, so that the quantity of light guided by the light incident surface is increased to improve the sensing effect of the sensor. Further, the light pipe has a barrier layer coated on a surface of the light pipe to prevent the light emitted from the LED light sources from being guided to the sensor by the light pipe.

In general, the external ambient light has no significant change in a short time. To control the automatic modulated lighting frequency of the auto-sensing dimming lamp, the processor collects a plurality of sensing data in a predetermined time, and each of the sensing data includes the detected signal waveform data, and the predetermined time falls within a range from 3 seconds to 15 seconds, and the processor calculates an average modulation datum and a light emission status of the LED light sources according to the average modulation datum. In addition, the sensing data further include a brightness value and/or a color temperature value of the external ambient light. Therefore, the lamp of this disclosure can adjust the light according to the environment effectively.

The auto-sensing dimming lamp of this disclosure is a down light or a bulb light, and the sensor is installed at the center position of a surface of the base, and the LED light sources are disposed on the surface of the base and arranged in a circular shape with respect to the center of the sensor.

In summation, the auto-sensing dimming lamp adjusts the light emission status automatically according to the detected ambient light to provide the most suitable lighting effect to users, and also uses the pass filter unit to eliminate the influence of any light other than the ambient light effectively, so as to enhance the detection accuracy of the sensor and reduce wrong detection results. In addition, this disclosure uses the light pipe as a device for collecting external ambient light. Compared with the conventional sensing lamps, the lamp of this disclosure can prevent the sensor from receiving too much light from the LED light sources which may affect the detection result.

DESCRIPTION OF THE PREFERRED EMBODIMENTS

Figure 1:
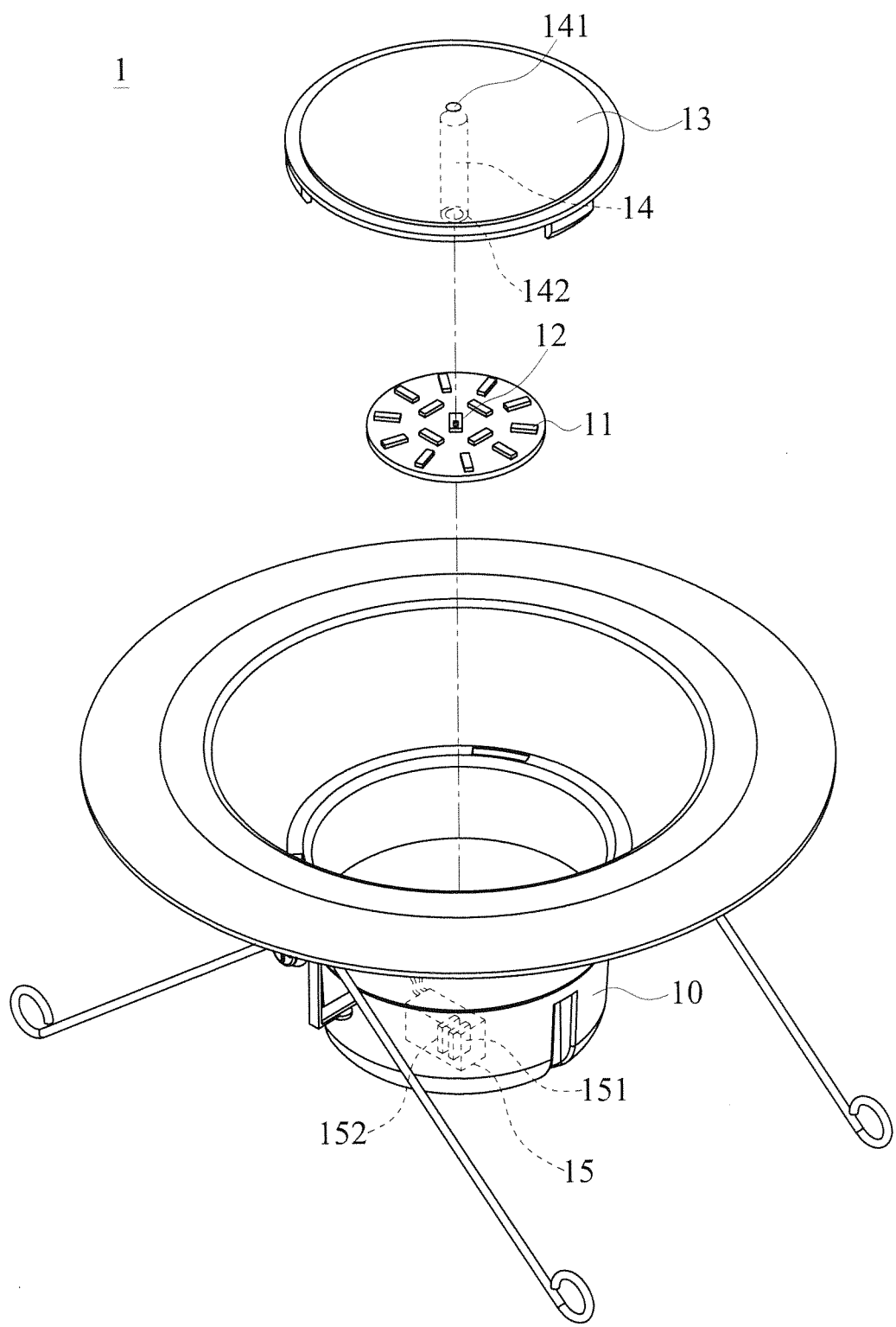
FIG. 1 is an exploded view of a preferred embodiment of this disclosure.
Figure 2:
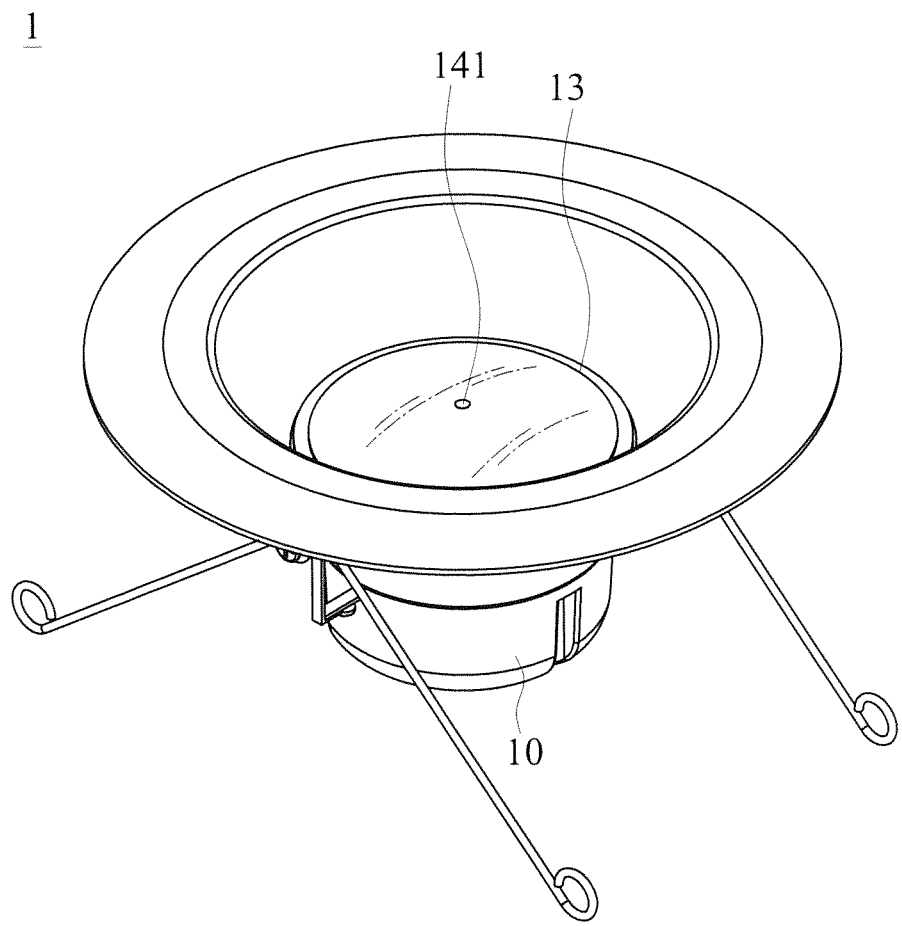
FIG. 2 is a perspective view of a preferred embodiment of this disclosure.
Figure 3:
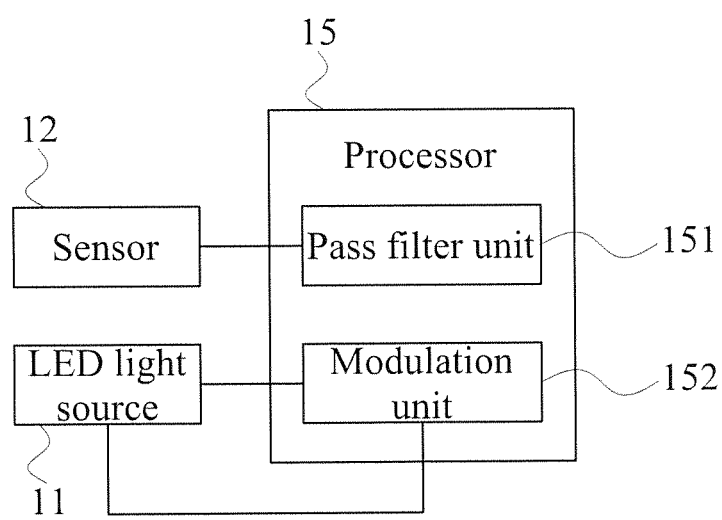
FIG. 3 is a schematic block diagram of a sensor, an LED light source and a processor in accordance with a preferred embodiment of this disclosure.

The technical content of this disclosure will become apparent with the detailed description of preferred embodiments and the illustration of related drawings as follows.

With reference to FIGS. 1, 2, 3, 4 and 5-6 for an exploded view, a perspective view, a schematic block diagram of a sensor, an LED light source and a processor, a schematic view of comparing a detected signal waveform with a driving voltage waveform, and cross-sectional views of different applications in accordance with a preferred embodiment of this disclosure respectively, an auto-sensing dimming lamp 1 of this disclosure comprises a base 10, a plurality of LED light sources 11, a sensor 12 and a lamp cover 13. The LED light sources 11 and the sensor 12 are installed at the base 10, and the lamp cover 13 is covered onto the base 10 and coupled to an edge of the base 10 for sealing the LED light sources 11 and the sensor 12. The auto-sensing dimming lamp 1 further comprises a light pipe 14 and a processor 15.

The light pipe 14 is installed at the lamp cover 13 and extended from the lamp cover 13 towards the base 10, and an end of the light pipe 14 is abutted against the sensor 12 to guide an external ambient light to enter into the lamp cover 13, so that the ambient light can be detected by the sensor 12. Wherein, the light pipe 14 has a light incident surface 141 and a light exit surface 142, and the light incident surface 141 is disposed on an outer plane of the lamp cover 13, and the light exit surface 142 is contacted with and abutted against the sensor 12, so that light may be entered from the light incident surface 141 into the light pipe 14 and guided by the light pipe 14 to project from the light exit surface 142 to the sensor 12, and the external ambient light is guided more accurately and completely.

The processor 15 is installed at the base 10 and includes a pass filter unit 151 and a modulation unit 152. The pass filter unit 151 is electrically coupled to the sensor 12 and the LED light sources 11 for receiving a detected signal waveform A received by the sensor 12 and a driving voltage waveform B of the LED light sources 11. If a section has a level of the driving voltage waveform B equal to zero, the detected signal waveform A of the section has a residual light level C and a ambient light level D, and the residual light level C is higher than the ambient light level D, and the pass filter unit 151 just captures the ambient light level D and eliminates the residual light level C. The modulation unit 152 is electrically coupled to the pass filter unit 151 for automatically modulate and drive the light emission status of the LED light sources 11 according to the information of the ambient light level D. The processor 15 eliminates the residual light level C, so that the auto-sensing dimming lamp 1 can effectively prevent misjudgment caused by the light of the LED light sources 11 projected onto the sensor 12 to further enhance the detection accuracy of the auto-sensing dimming lamp 1 and ensure that the LED light sources 11 are modulated completely according to the external ambient light.

Figure 4:
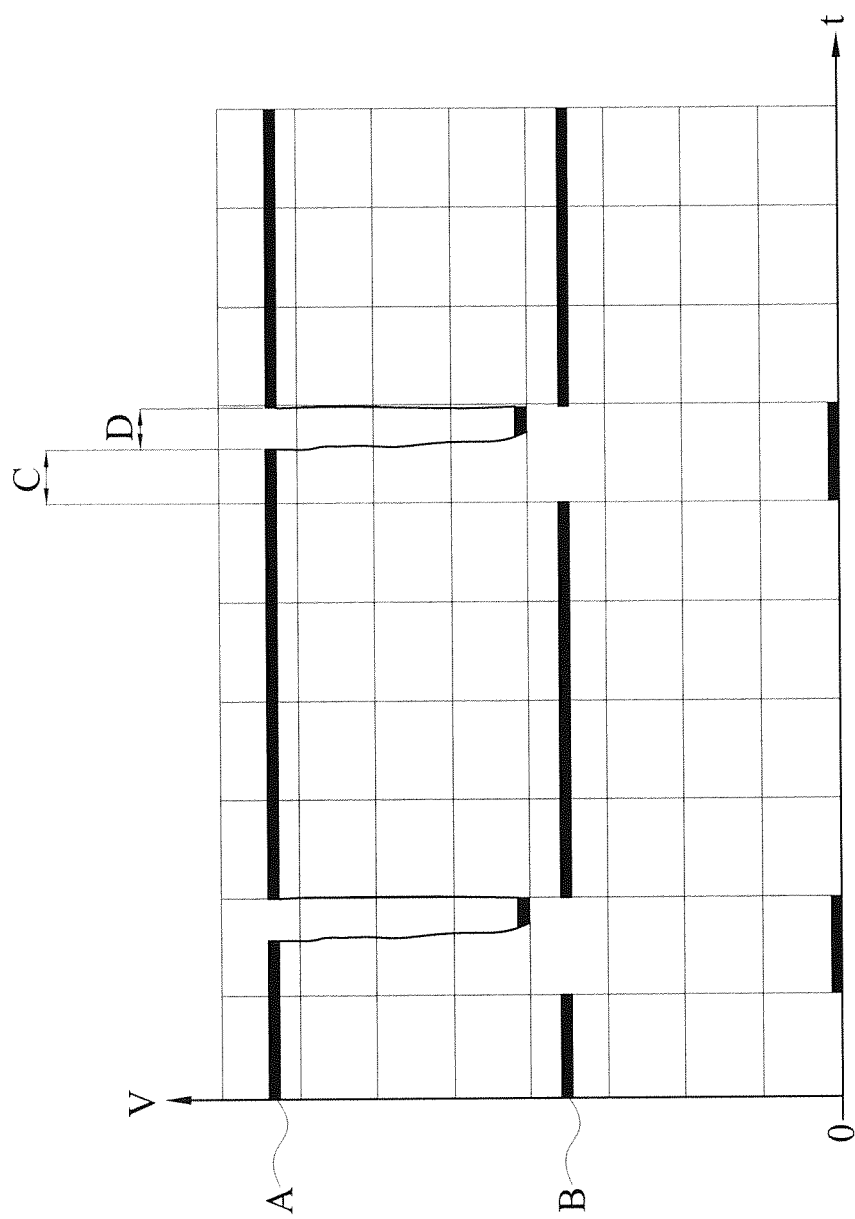
FIG. 4 is a schematic view of comparing a detected signal waveform with a driving voltage waveform in accordance with a preferred embodiment of this disclosure.

With reference to FIG. 4 for a schematic view of comparing a detected signal waveform with a driving voltage waveform, if a section with the level of the driving voltage waveform A equal to zero, the detected signal waveform B of the section has the residual light level C and the ambient light level D. Now, the pass filter unit 151 eliminates the residual light level and the determination of modulating the LED light sources is not made to avoid any residual light of the LED light sources 11 from affecting the detection result and prevent inaccurate modulation of the LED light sources 11.

In addition, the processor 15 is set with a switching frequency for the LED light sources 11, and the switching frequency falls within a range from 1K to 4 KHz, so as to achieve the energy saving effect. In this range of switching frequency, users may visually observe that the residual light effect is minimized to prevent any flicker produced by the auto-sensing dimming lamp 1 which may affect the lighting effect of the LED lamp. The lamp of this disclosure automatically adjust and drive the light emission status of the LED light sources 11 according to the information of the ambient light level D, and outputs a sensing light with multistage different brightness by adjusting the duty ratio of the driving voltage waveform B. In other words, the modulation of this disclosure is achieved by adjusting the duty ratio of the driving voltage waveform B to effectively provide more diversified light output modes of the auto-sensing dimming lamp 1.

The auto-sensing dimming lamp 1 may be a down light or a bulb light, and the auto-sensing dimming lamp 1 of this embodiment is a down light, but it is not limited to such arrangement only. In this disclosure, the installation of the LED light sources 11 may be adjusted according to different lighting requirements. Preferably, the sensor 12 is installed at the center position of a surface of the base 10, and the LED light sources 11 are disposed on the surface of the base 10 and arranged in a circular shape with respect to the center of the sensor 12.

In addition, the processor 15 collects a plurality of sensing data in a predetermined time, and each of the sensing data includes data of the detected signal waveform A, and the predetermined time falls within a range from 3 seconds to 15 seconds, and the processor 15 calculates an average modulation datum of the sensing data and adjusts the light emission status of the LED light sources 11 according to the average modulation datum. Therefore, the adjusting frequency of the auto-sensing dimming lamp 1 is restricted further for the LED light sources 11. In other words, the processor 15 starts analyzing and computing data after collecting a specific quantity of sensing data and primarily computes the statistics of the data of the detected signal waveform A and the driving voltage waveform B included in each of the sensing data to obtain the average modulation datum, and then adjusts the light emission status of the LED light sources 11 according to the average modulation datum. In general, the external ambient light does not have a significant difference in a very short time, so that when the detection frequency of the sensor 12 is high (or the interval between detections is small), the processor 15 is prevented from adjusting the status of the LED light sources 11 too often and thus resulting in non-beneficial modulations. In addition, each of the sensing data further includes a brightness value and/or a color temperature value of the external ambient light, so that the processor 15 has more reference information for adjusting the LED light sources 11 and modulates the light emission status of the LED light sources 11 according to the external ambient light more accurately.

Figure 5:
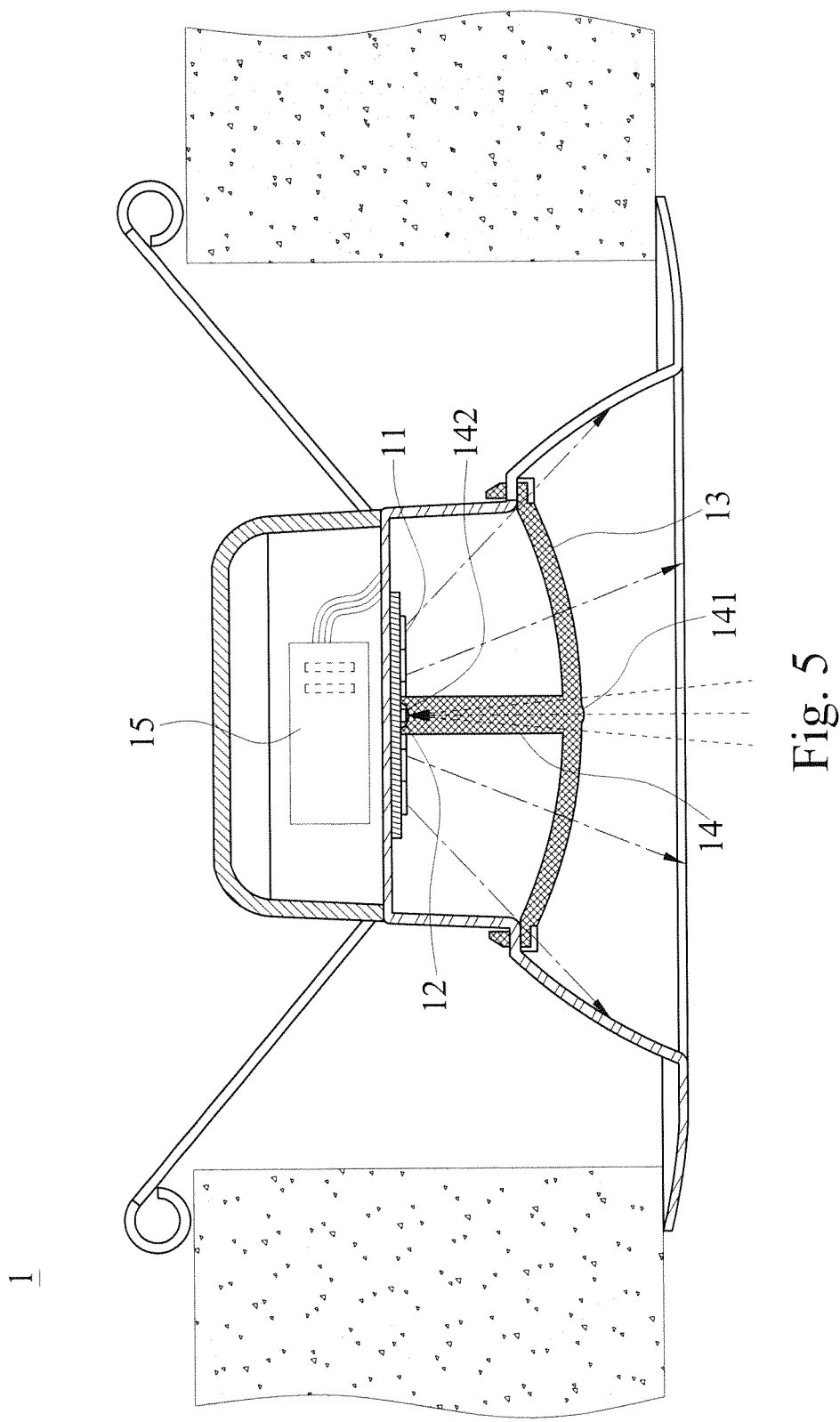
FIG. 5 is a first cross-sectional view of an application of a preferred embodiment of this disclosure.
Figure 6:
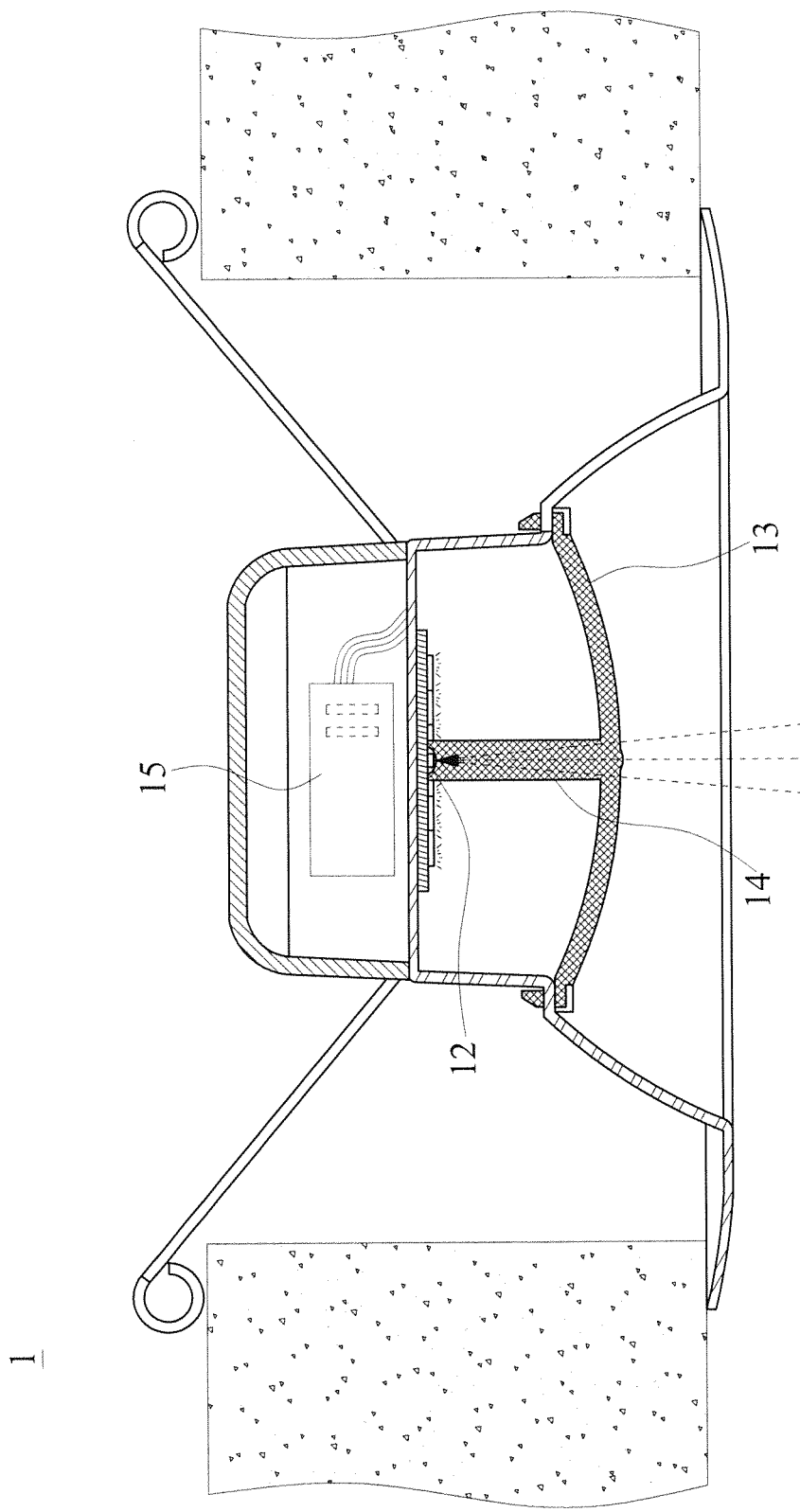
FIG. 6 is a second cross-sectional view of an application of a preferred embodiment of this disclosure.

In an application of the auto-sensing dimming lamp 1, the light pipe 14 guides external ambient light to enter from the light incident surface 141 into the lamp cover 13, and to be outputted from the light exit surface 142 to the sensor 12 as shown in FIG. 5. Now, the sensor 12 obtains the sensing data and the contents of the sensing data including the data of the detected signal waveform A, and the brightness value and/or color temperature value according to the external ambient light. After the processor 15 has received the sensing data, the pass filter unit 151 captures the ambient light level D, and the modulation unit 152 modulates the LED light sources 11 according to the information of the level of the ambient light D. In the meantime, the processor 15 also determines the adjusting status of the LED light sources 11 according to the information of the brightness value and the color temperature value of the external ambient light together with the information of the ambient light level D. If the detection result of the sensor 12 shows that the external ambient light has a greater brightness and believes that it is necessary to reduce the brightness of the LED light sources 11, the auto-sensing dimming lamp 1 will automatically adjust the light emission status of the LED light sources 11 as shown in FIG. 6, so that the auto-sensing dimming lamp 1 has a weaker lighting effect to achieve the energy saving effect and provide a lighting effect in compliance with the brightness of the external ambient light. On the other hand, if the external ambient light is too weak, the auto-sensing dimming lamp 1 provides a fill light effect. During the process of adjusting the light, the sensor 12 continues receiving the external ambient light guided by the light pipe 14 or pauses receiving the external ambient light guided by the light pipe 14 while adjusting the light.

Figure 7:
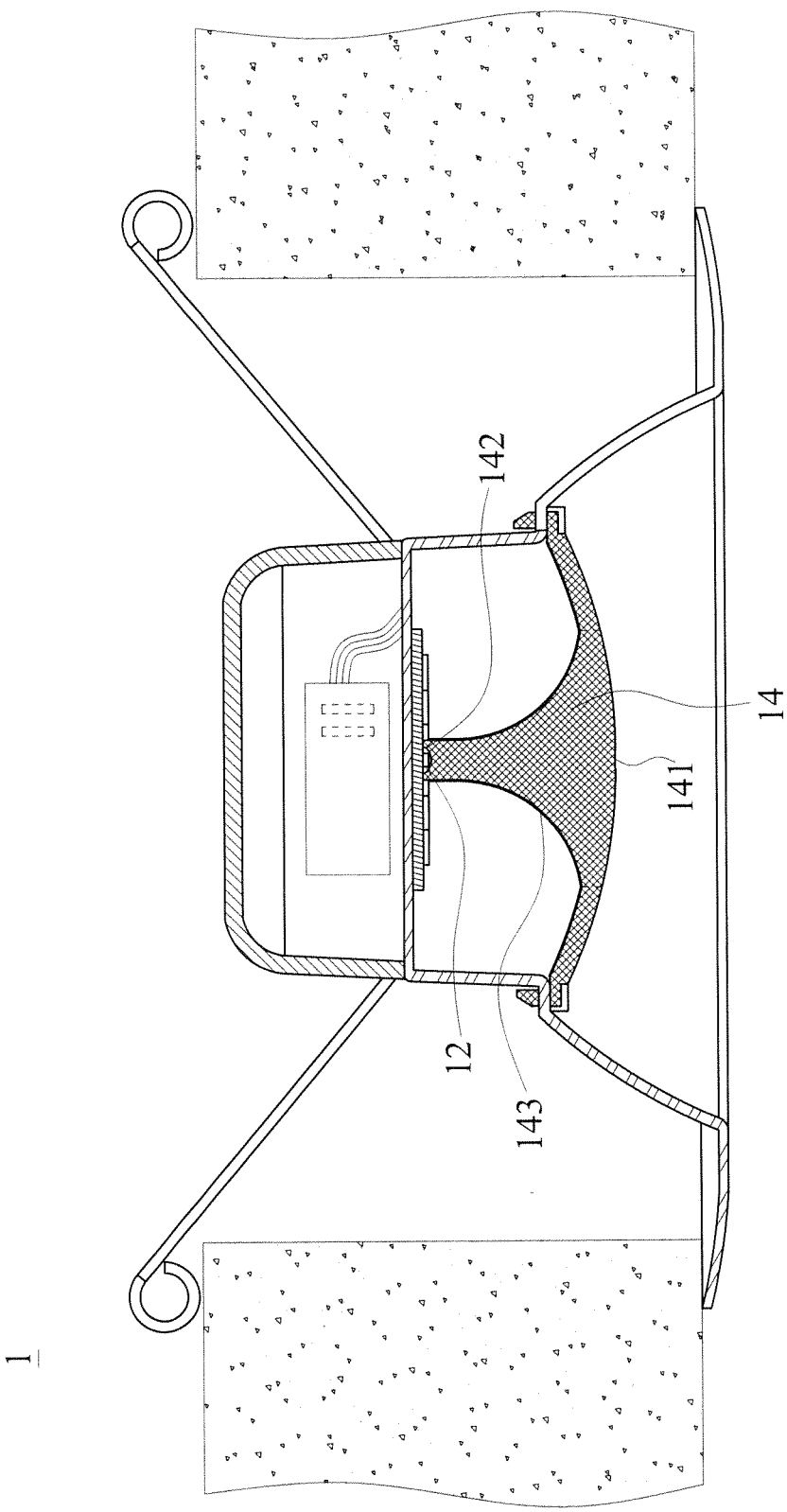
FIG. 7 is a cross-sectional view of another implementation mode of a preferred embodiment of this disclosure.

With reference to FIG. 7 for a cross-sectional view of another implementation mode of a preferred embodiment of this disclosure, the light incident surface 141 of the light pipe 14 has an area greater than the area of the light exit surface 142, and the light pipe 14 may be a cylindrical body or conical body tapered from the light incident surface 141 towards the light exit surface 142 as shown in FIG. 7. Increasing the area of the light incident surface 141 can increase the quantity of the external ambient light captured by the light pipe 14, so that the light pipe 14 guides sufficient light for the detection, and the area of the light exit surface 142 is preferably just large enough to cover the sensor 12 to enhance the light receiving performance of the sensor 12. In addition, a barrier layer 143 is coated on a surface of the light pipe 14 for blocking light to prevent the light of the LED light sources 11 from being guided by the light pipe 14 to the sensor 12 or affecting the detection result.

The auto-sensing dimming lamp 1 of this disclosure detects the external ambient light to adjust the light emission status of the LED light sources 11, so as to automatically adjust the lighting effect most suitable to users according to the detection result and achieve the energy saving effect. Since the sensor 12 is still affected by the light of the LED light sources 11 during the detection and results in a wrong decision easily, and fails to modulate the LED light sources 11 according to the actual condition of the ambient light, therefore this disclosure uses the pass filter unit 151 to eliminate the driving voltage waveform B of the LED light sources 11 and the residual light level C of the corresponsive detected signal waveform A and just captures the ambient light level D as the basis for adjusting the light emission status of the LED light sources 11, so that the auto-sensing dimming lamp 1 can adjust the lighting effect according to the external ambient light accurately. In addition, the sensor 12 obtains the detected signal waveform A according to the ambient light as well as the information including the brightness value and the color temperature value of the external ambient light, and then computes the sensing data in the predetermined time to obtain the average modulation datum, so as to adjust the lighting in the determined time. The lamp of this disclosure also uses the light pipe 14 to effectively guide the external ambient light to enter into the lamp cover 13, and the external ambient light is received and detected by the sensor 12. The light pipe 14 further prevents the sensor 12 from being affected by the LED light sources 11, so as to achieve the effect of more accurate detection and modulation.

What is claimed is:

1. An auto-sensing dimming lamp, comprising a base, a plurality of LED light sources, a sensor and a lamp cover, and the LED light sources and the sensor being installed at the base, and the lamp cover being covered onto the base and coupled to an edge of the base for sealing the LED light sources and the sensor, and the auto-sensing dimming lamp, comprising:

a light pipe, installed at the lamp cover, and extended from the lamp cover towards the base, and an end of the light pipe abutting against the sensor to guide an external ambient light to enter into the lamp cover and to be detected by the sensor; and a processor, installed at the base, and comprising:

a pass filter unit, electrically coupled to the sensor and the LED light sources for receiving a detected signal waveform detected by the sensor and a driving voltage waveform of the LED light sources, wherein if a section of a level of the driving voltage waveform equals to zero, the detected signal waveform corresponding to the section has a residual light level and an ambient light level, and the residual light level is higher than the ambient light level, and the pass filter unit only captures the ambient light level and eliminates the residual light level; and a modulation unit, electrically coupled to the pass filter unit, for automatically adjusting a light emission status and driving the LED light sources according to the information of the ambient light level.

2. The auto-sensing dimming lamp as claimed in claim 1, wherein the processor has a switching frequency set for the LED light sources, and the switching frequency falls within a range of 1K-4 KHz.

3. The auto-sensing dimming lamp as claimed in claim 2, wherein the light emission status of the LED light sources is automatically adjusted and driven according to the information of the ambient light level, and a sensing light is outputted with multistage different brightness by adjusting the duty ratio of the driving voltage waveform.

4. The auto-sensing dimming lamp as claimed in claim 3, wherein the light pipe has a light incident surface and a light exit surface, and the light incident surface is disposed on an outer plane of the lamp cover, and the light exit surface is abutted and contacted with the sensor.

5. The auto-sensing dimming lamp as claimed in claim 4, wherein the light pipe has a barrier layer coated on a surface of the light pipe for preventing the light emitted from the LED light sources from being guided to the sensor by the light pipe.

6. The auto-sensing dimming lamp as claimed in claim 4, wherein the light incident surface has an area greater than the area of the light exit surface.

7. The auto-sensing dimming lamp as claimed in claim 5, wherein the light incident surface has an area greater than the area of the light exit surface.

8. The auto-sensing dimming lamp as claimed in claim 1, wherein the sensor is disposed at the center position of a surface of the base, and the LED light sources are disposed on the surface of the base and arranged in a circular shape with respect to the center of the sensor.

9. The auto-sensing dimming lamp as claimed in claim 1, wherein the processor collects a plurality of sensing data in a predetermined time, and each of the sensing data includes the detected signal waveform data, and the predetermined time falls within a range of 3 seconds to 15 seconds, and the processor calculates an average modulation datum of the sensing data and adjusts a light emission status of the LED light sources according to the average modulation datum.

10. The auto-sensing dimming lamp as claimed in claim 9, wherein the sensing data further include a brightness value and/or a color temperature value of the external ambient light.

11. The auto-sensing dimming lamp as claimed in claim 1, wherein the auto-sensing dimming lamp is a down light or a bulb light.

\* \* \* \* \*